INVENTOR.
FRANCIS G. WINTERS
BY
ATTORNEYS

United States Patent Office 3,506,116
Patented Apr. 14, 1970

3,506,116
FULLY INSULATED C RINGS
Francis G. Winters, Englishtown, N.J., assignor to Thomas & Betts Corporation, Elizabeth, N.J., a corporation of New Jersey
Filed Dec. 13, 1968, Ser. No. 783,691
Int. Cl. B65d 83/00
U.S. Cl. 206—56    4 Claims

ABSTRACT OF THE DISCLOSURE

A coherent strip of adjacently spaced C rings each of which has a steel wire core embedded in a plastic material and is adapted to embrace a plurality of parallel members or wires. The inner surface of each C ring is rib shaped and the ends thereof are reversely curved to povide a smooth lip on its inner surface. Further, the ends of the wire core are recessed within the plastic and contain thereover a plastic covering to provide a fully insulated member.

---

This invention relates to C rings or clips and more particularly to such rings having a wire core completely embedded in a plastic covering.

C rings or other tying means are frequently utilized to group together a plurality of cylinlrical members or wires. They are particularly well adapted to group together a plurality of parallel wires or cables as utilized in electrical equipment. C rings of this general class are disclosed in the coassigned U.S. Patent No. 3,170,160, issued Feb. 23, 1965, the disclosure of which is incorporated herein by this reference thereto. Therein is described a coherent strip of C rings, and a method of making the same, which are adapted for magazine rail loading in power operated hand tools. The strip of C rings is adapted to be fed through such tool and deformed singly in succession on and about a plurality of wire conductors arranged in bunched parallelism. The coherent strip of C rings, as described therein, comprises a plurality of spaced parallel members having a steel wire core and a plastic insulating material thereabout. Adjacent members are interconnected by a relatively thin plastic web, with each member having an arcuately shaped outer surface and a ribbed inner surface. The ends of each member are offset from each other and reversely curved to provide a smooth lip on the inner surface. Further, the end of the wire core is recessed within the ends of the extruded plastic to enable their free passage about a plurality of insulated wire conductors to be bundled or grouped.

The type of C rings disclosed in the aforementioned patent is particularly suitable for general usage. However, in certain types of applications or environments, such an open ended C ring is not entirely satisfactory. Although the wire core is recessed within the extruded plastic, it is not sufficiently insulated for certain electrical systems operating in particular environments. For instance, when a plurality of wire conductors are to be employed in a subterranean environment, an open ended C ring may not be satisfactory as a tying means. Due to the moisture in the ground, leakage between the wire conductors and the open ended C ring can cause serious electrical problems. A similar problem exists when utilizing a C ring of the type described in the aforementioned patent in an environment having a high humidity. Again, leakage can provide substantial electrical problems.

The invention herein disclosed, in general, provides a coherent strip of fully insulated C rings. A plurality of parallel members, interconnected by means of a thin plastic web, each has an inner wire core and an extruded plastic covering. Each member is provided with an arcuately shaped outer surface and a ribbed inner surface with the ends thereof being disposed to be contiguously spaced upon closing thereof. Further, the ends of each member are reversely curved to provide a smooth lip on the inner surface and include an enclosing plastic end about the inner wire core. The wire core is thereby completely insulated in plastic which precludes the leakage and shorting problems possible with the prior art devices.

Accordingly, it is a primary object of this invention to provide an insulated C ring of the character herein described which is not subject to the aforementioned disadvantages.

Another object of the invention is to provide a C ring wherein the wire core is fully insulated.

A further object of the invention is to provide a C ring which contains an enclosing plastic end over the inner wire core.

These and other objects, advantages and features of the invention will become more apparent from the following description taken in conjunction with the accompanying drawing wherein.

Figures 1, 2, 3, 4:
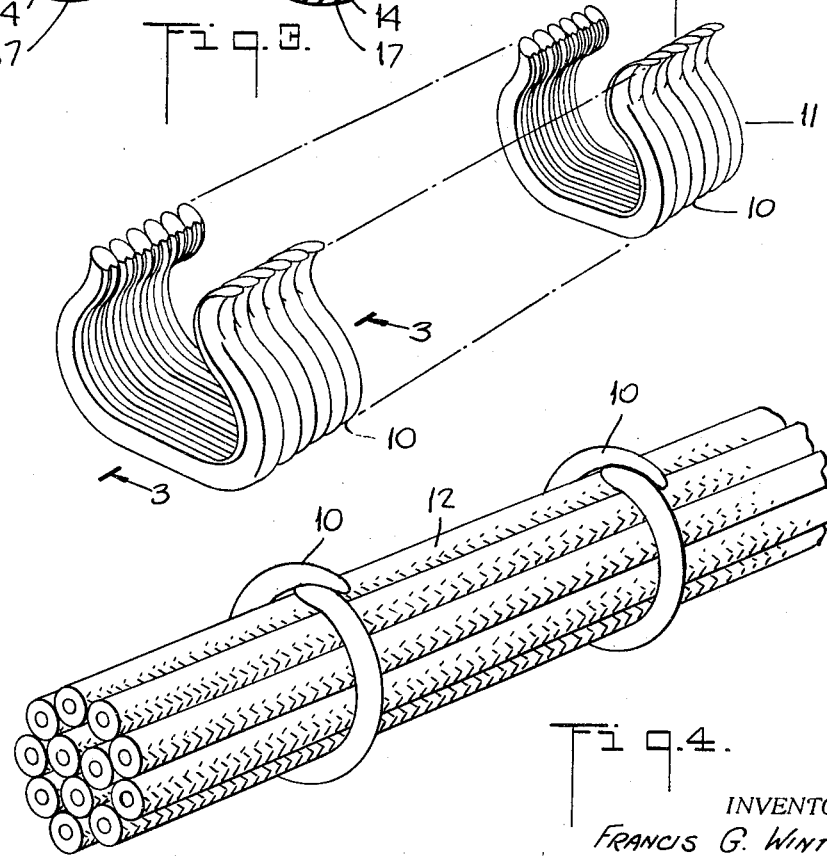
FIG. 1 is an end elevation view of the fully insulated C ring.
FIG. 2 is a perspective view of a strip of coherent C rings having the free ends thereof reversely curved.
FIG. 3 is an enlarged fragmentary cross sectional view of the C ring taken along the line 3—3 of FIG. 2.
FIG. 4 is a perspective view depicting a pair of fully insulated C rings embracing a plurality of insulated wire conductors arranged in bunched parallelism.

Referring to the drawings, a plurality of adjacently spaced C rings 10 are placed in strip form as indicated at 11 in FIG. 2. The strip 11 is adapted to be passed through a hand tool (not shown) which deforms each successive C ring 10. The deformed C rings 10 are thereby embraced about a plurality of parallel wire conductors 12 in the manner indicated in FIG. 4.

Each C ring 10 contains therein a tempered steel wire core 13 having top and bottom flat surface 14, and rounded parallel side margins 15. The wire core 13 is embedded in a plastic material 16, preferably a high impact rigid type such as polyvinylchloride. The flat surfaces 14 of the wire core 13 permit a thicker deposit of plastic thereon in the form of a half round bead 17 on the outer surface, and a pair of spaced parallel V ribs 18 on the inner surface. Adjacent C ring members 10 are interconnected by means of a thin plastic web 19.

Each C ring is bent ito the C shape depicited in FIG. 1, with the free ends thereof being slightly offset to permit contiguous spacing thereof as the members are deformed about a group of wire conductors. Further, the ends are reversely curved, as at 20, to provide smooth entrance lips thereon. The plastic material on the reversely curved end portion of the ring 10 is deformed and may be caused to creep beyond the free ends of the enclosed wire core 13. The C ring 10 is then further processed to include a capped end 21 which provides a complete enclosure of the wire core 13. The capped end 21 is provided by dipping or rolling thereon additional plastic which bonds with the insulating plastic 16. Preferably, the plastic capped end 21 is of the same material as the plastic 16, although any suitable plastic which will bond thereto will suffice. The capped end 21 should be of a sufficient thickness to preclude any leakage between the electrical conductors 12 and the C ring 10. It has been found that a minimum capped end thickness of .010 inch is desirable. In lieu of the dipping or rolling of additional plastic to the free end of the C ring, a plastic cap may be substituted. Thus, the free ends of each C ring are embedded in plastic and the wire core 13 of the C ring is completely enclosed within a plastic material thereby precluding any possibility of electrical leakage between the wire conductors and the C ring.

Other modifications and variations of the invention as hereinbefore set forth may be made without departing from the spirit and scope thereof, and therefore only such limitations should be imposed as are indicated in the appended claims.

What is claimed is:

1. A coherent strip of fully insulated C rings for grouping a plurality of cylindrical members comprising a section of extruded plastic presenting a plurality of spaced parallel C-shaped members interconnected by a relatively thin plastic web therebetween, each of said members including an arcuately shaped outer surface and a ribbed inner surface including a pair of V-ribs extending lengthwise on said members, each of said members further including a steel wire core having opposite flat surfaces and semi-circular margins, said parallel C-shaped members having the ends thereof formed at an acute angle to the main body portion thereof whereby the ends of each member are contiguously spaced when said C-shaped members are closed, said ends of said members being reversely curved to provide a smooth lip on the inner side of each C-ring and including fully enclosing plastic ends whereby said wire core is completely embedded in said plastic prior to and after embracing said plurality of cylindrical members.

2. The apparatus of claim 1 wherein said enclosing plastic ends include an end cap disposed about each end of said C-rings 3. The apparatus of claim 1 wherein the free end faces of said wire core are recessed within the end of the extruded plastic thereon, and said ends of said extruded plastic thereon are sealed thereby completely embedding said wire core in said plastic.

4. The apparatus of claim 1 wherein said enclosing plastic ends comprise a plastic coating applied to said ends and forms an integral bond with said extruded plastic spaced about said wire core.

References Cited

UNITED STATES PATENTS

| 3,170,160 | 2/1965 | Burniston. |
| 3,076,373 | 2/1963 | Matthews. |
| 3,252,569 | 5/1966 | Matthews | 206—560 |

JOSEPH R. LECLAIR, Primary Examiner

J. M. CASKIE, Assistant Examiner